(12) United States Patent
Wu et al.

(10) Patent No.: US 8,149,194 B2
(45) Date of Patent: Apr. 3, 2012

(54) LIQUID CRYSTAL DISPLAY AND BASE STRUCTURE THEREOF

(75) Inventors: Yu-Ching Wu, Taipei County (TW); Wei-Chieh Hsu, Taipei County (TW)

(73) Assignee: AmTran Technology Co., Ltd, Chung Ho, Taipei County (TW)

( * ) Notice: Subject to any disclaimer, the term of this patent is extended or adjusted under 35 U.S.C. 154(b) by 317 days.

(21) Appl. No.: 12/628,858

(22) Filed: Dec. 1, 2009

(65) Prior Publication Data
US 2011/0128213 A1 Jun. 2, 2011

(51) Int. Cl.
*G09G 3/36* (2006.01)
(52) U.S. Cl. .......................................................... 345/87
(58) Field of Classification Search .................... 345/87; 361/679.22; 180/346; 72/422; 296/146.4
See application file for complete search history.

(56) References Cited

U.S. PATENT DOCUMENTS

| | | | | |
|---|---|---|---|---|
| 5,144,720 A | * | 9/1992 | Aihara et al. | 16/232 |
| 5,335,533 A | * | 8/1994 | Rehus | 72/422 |
| 5,624,150 A | * | 4/1997 | Venier | 296/146.11 |
| 7,143,861 B2 | * | 12/2006 | Chu | 180/346 |
| 7,438,346 B1 | * | 10/2008 | Breed | 296/146.4 |
| 7,869,202 B2 | * | 1/2011 | Chiang et al. | 361/679.22 |
| 2004/0055110 A1 | * | 3/2004 | Breed et al. | 16/82 |

FOREIGN PATENT DOCUMENTS

TW M284184 12/2005

* cited by examiner

*Primary Examiner* — Fred Tzeng
(74) *Attorney, Agent, or Firm* — Winston Hsu; Scott Margo

(57) ABSTRACT

A base structure is used for bearing a display. The base structure includes a support and a seat. The support is connected to a display at one end and detachably disposed on the seat at the other end. The support has a buckling member, and the seat has at least one slot. The buckling member is fitted on the end of the support disposed on the seat, and is rotatable between a release position and a clamping position relative to the support. The buckling member has at least one baffle. When the buckling member is at the release position, the support is detached from the seat by passing the baffle through the slot. When the buckling member is at the clamping position, the baffle and the slot form an angle, and the baffle and the seat have a retaining relationship so as to lock the support on the seat.

24 Claims, 10 Drawing Sheets

LIQUID CRYSTAL DISPLAY AND BASE STRUCTURE THEREOF

BACKGROUND OF THE INVENTION

1. Field of Invention

The present invention relates to a base structure, and more particularly to a base structure for bearing a display.

2. Related Art

Since its appearance, television has provided a user with the opportunity of viewing the newest things over the world at home and getting entertainment and knowledge. With the rapid development of the electronic industry, television has progressed from the earliest cathode ray tube (CRT) to the currently most popular thin display such as liquid crystal display (LCD) and plasma display panel (PDP). Meanwhile, compared with the CRT, the thin display is characterized in having a light weight, thin thickness, and high-quality image display effect, and is thus widely applied in computers or various video devices.

Having a structural form different from that of the early CRT, the thin display cannot directly stand on a plane like a tabletop or ground surface, so that the thin display must be joined to a base and stand on a plane by the support of the base. Moreover, in order to facilitate the packaging, transportation, and warehousing of the thin display and effectively reduce the space occupied by the thin display after being encased, the base of the thin display is generally designed to be detachable and separable. A base currently applied to the thin display mainly includes a seat and a support. One end of the support is locked on the thin display, and a joining hole and a through hole corresponding to each other are respectively disposed on the other end of the support and the seat. Thereby, a locking member (such as a screw) is directly screwed in the joining hole of the support after passing through the through hole of the seat, so as to form a fixing state between the seat and the support and provide the function of supporting and fixing the thin display.

However, in the disassembly and assembly of the base of the thin display, an appropriate tool such as a cross screwdriver or straight screwdriver must be used to turn the locking member to screw the locking member in or out of the joining hole of the support smoothly, thereby joining the support to or separating the support from the seat. Therefore, the user must prepare an appropriate tool to mount the support on or dismount the support from the seat smoothly each time the disassembly or assembly is performed. Meanwhile, the user bears the risk that the locking member is dropped or lost in the disassembly and assembly process, which causes great inconvenience to the disassembly and assembly.

SUMMARY OF THE INVENTION

Accordingly, the present invention is a base structure, capable of solving the problem that an appropriate tool is needed to join a support to or separate the support from a seat smoothly in a conventional base structure for a display, so as to avoid an energy-consuming and time-wasting disassembly/assembly process and facilitate the operation, and meanwhile solving the problem that a locking member for locking the support and the seat is easily dropped or lost due to improper operation of the operator in the disassembly/assembly process of the support and the seat in the conventional base structure.

The present invention provides a base structure for bearing a display. The base structure comprises a seat and a support. The seat includes a locking hole and at least one slot extends from a periphery of the locking hole. The support includes a bearing portion, a joining portion, and a buckling member. The bearing portion is connected to the display. The joining portion has a pivotal pillar that passes through the locking hole. The buckling member has a main body and at least one baffle. The baffle is disposed on a surface of the main body. The main body is fitted on the pivotal pillar of the support and is rotatable about the pivotal pillar between a clamping position and a release position. When the buckling member is at the release position, the support is detached from the seat by respectively passing the main body and the baffle through the locking hole and the slot; and when the buckling member is at the clamping position, the baffle and the slot form an angle, and the seat and the baffle have a retaining relationship so as to lock the support on the seat.

Also, the present invention provides a liquid crystal display (LCD). The LCD comprises a display, a seat and a support. The display is connected to the seat by the support. The seat includes a locking hole and at least one slot extends from a periphery of the locking hole. The support includes a bearing portion, a joining portion, and a buckling member. The bearing portion is connected to the display. The joining portion has a pivotal pillar that passes through the locking hole. The buckling member has a main body and at least one baffle. The baffle is disposed on a surface of the main body. The main body is fitted on the pivotal pillar of the support and is rotatable about the pivotal pillar between a clamping position and a release position. When the buckling member is at the release position, the support with the display is detached from the seat by respectively passing the main body and the baffle through the locking hole and the slot; and when the buckling member is at the clamping position, the baffle and the slot form an angle, and the seat and the baffle have a retaining relationship so as to lock the support with the display on the seat.

In the base structure of the present invention, the buckling member is movably disposed on the support and rotatable between the release position and the clamping position to change the relative position between the baffle and the slot, so that the support can be detached from or locked on the seat. Therefore, the user can lock the support on or detach the support from the seat by merely rotating the buckling member without using other tools, which is rather convenient in operation. Moreover, since the buckling member is directly disposed on the support, the drop or loss of the buckling member in the disassembly and assembly process of the support and the seat may be avoided.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
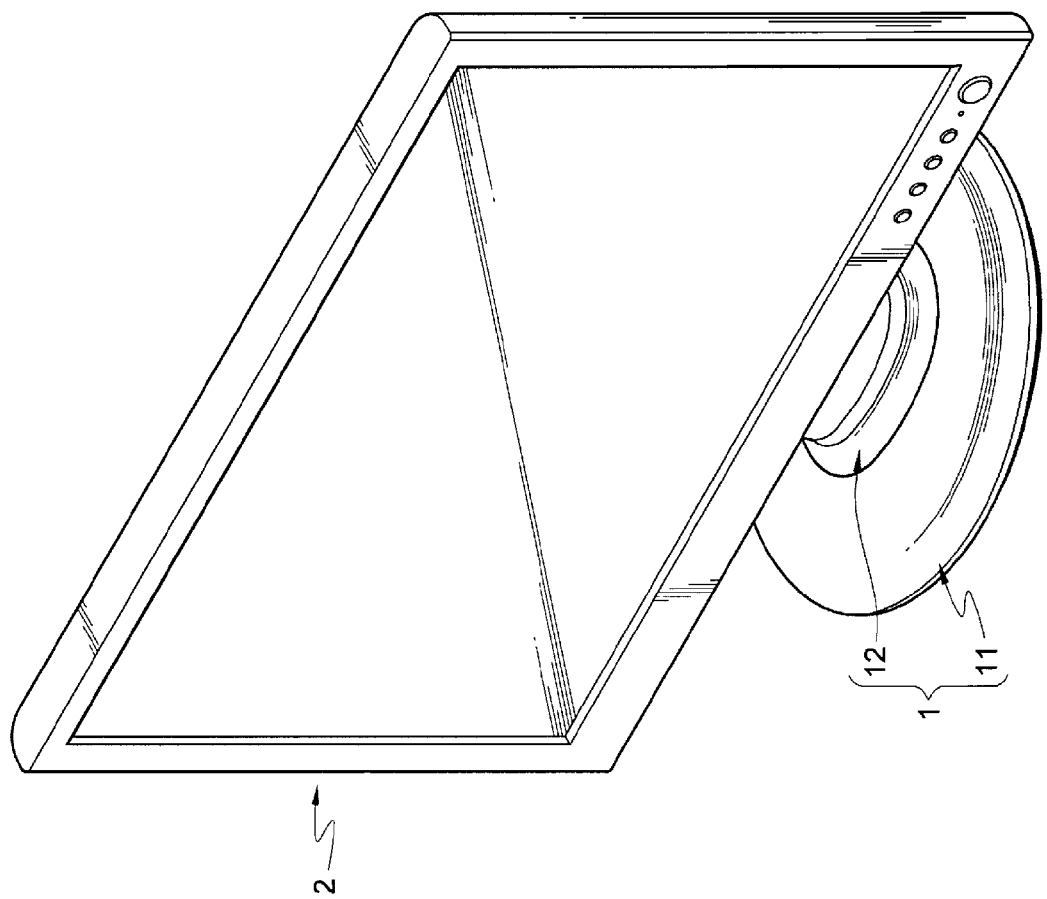
FIG. 1 is a schematic three-dimensional assembly view of an embodiment of the present invention.

As shown in FIG. 1, a base structure 1 provided in an embodiment of the present invention is applied to an LCD 3 for supporting a display 2 on a plane (not shown) such as a tabletop or ground surface.

Figure 2:
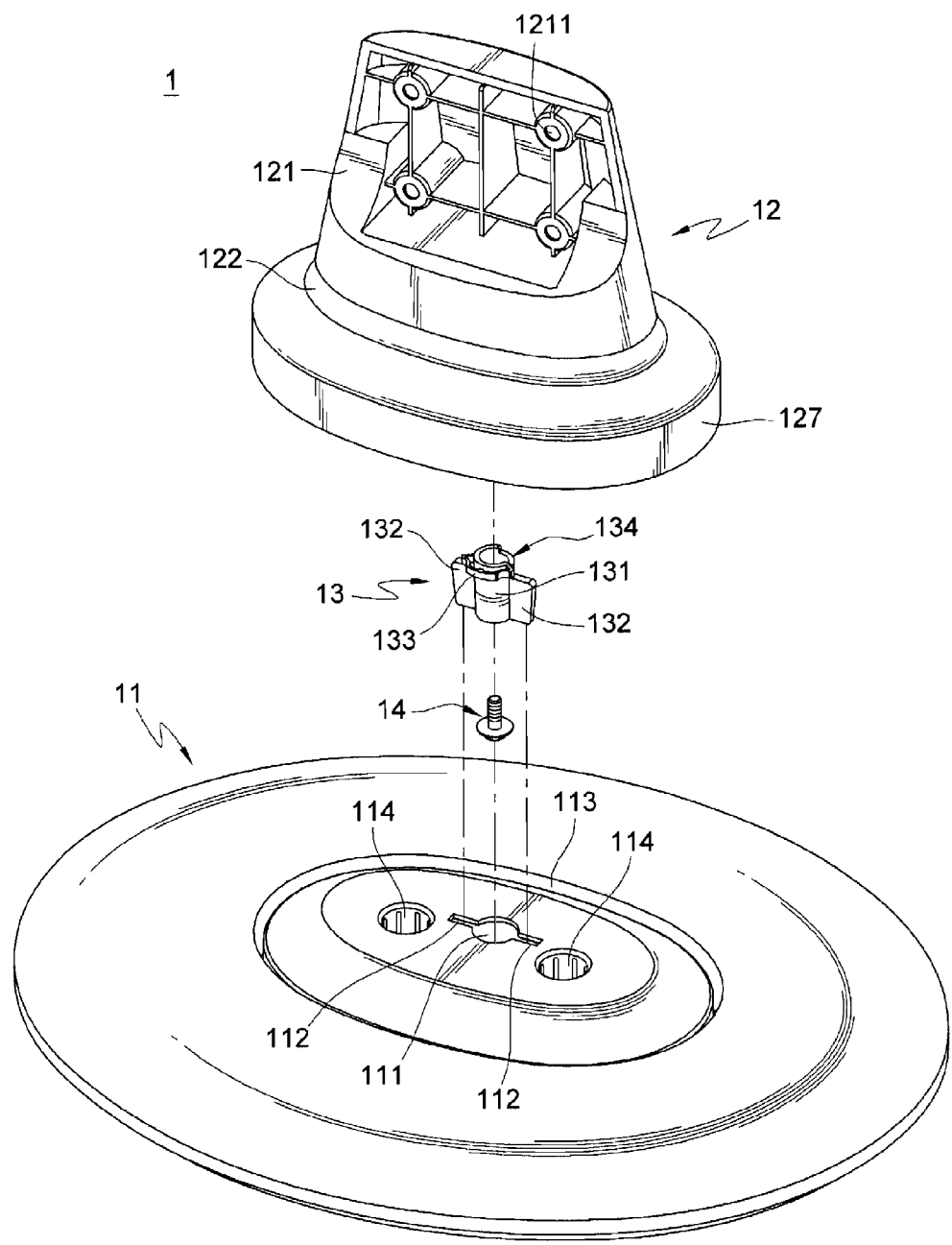
FIGS. 2 and 3 are schematic three-dimensional exploded views of a base structure in an embodiment of the present invention.
Figure 3:
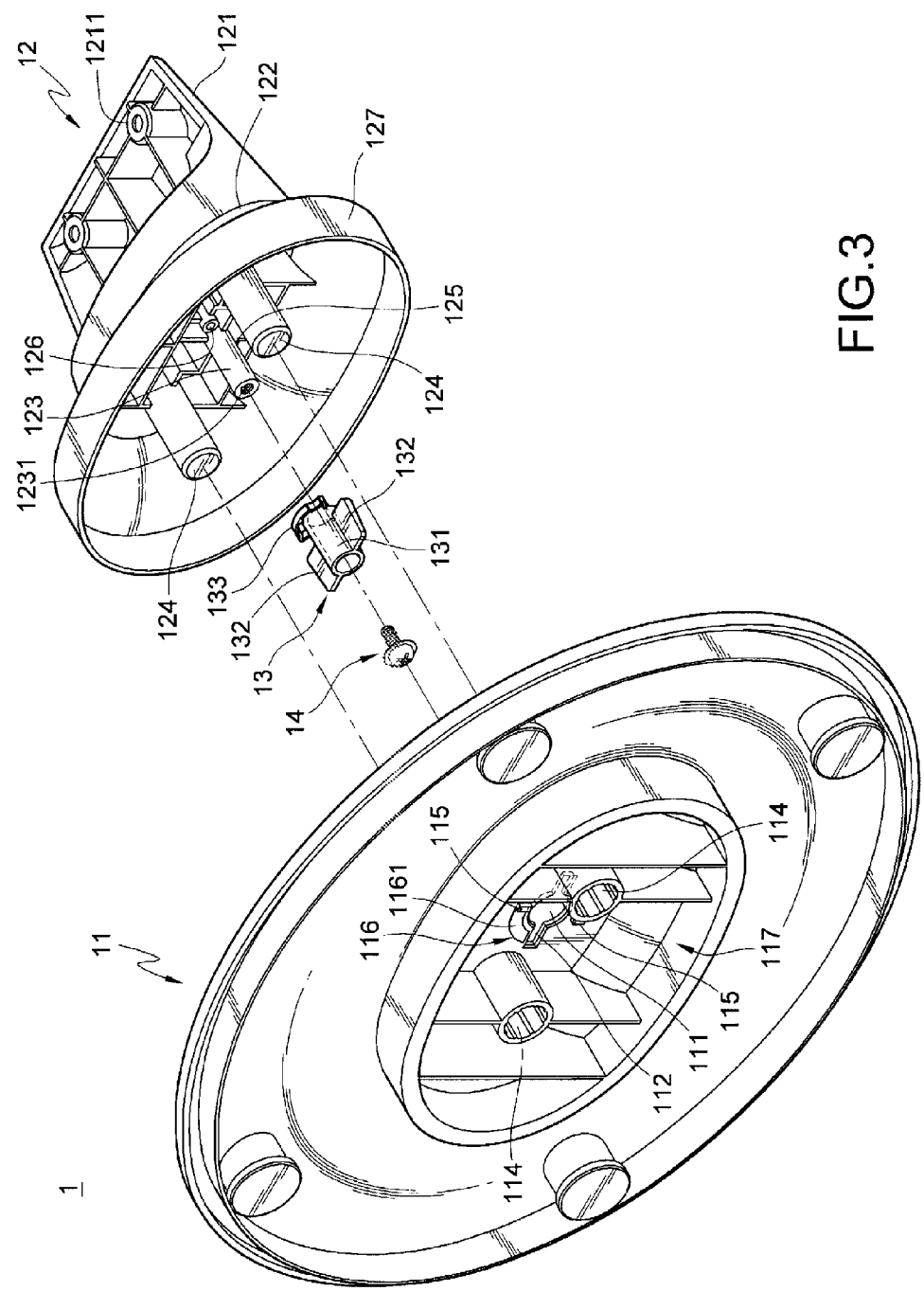

Referring to FIGS. 1 to 3, the base structure 1 has a seat 11, a support 12, and a limiting member 14. The seat 11 has a locking hole 111, two slots 112, a groove 113, and two positioning holes 114. The locking hole 111 and the slots 112 pass through the seat 11. Two slots 112 extend from a periphery at two opposite sides of the locking hole 111. The groove 113 is annularly disposed at one surface of the seat 11 opposite to the support 12, and the locking hole 111, the slots 112, and the positioning holes 114 are located in a range surrounded by the groove 113. The two positioning holes 114 are respectively disposed at two sides of the locking hole 111. Moreover, the positioning holes 114 may be disposed in a manner of passing through the seat 11 or merely passing through the seat 11 (for example, in the form of a blind hole). This embodiment takes the disposition manner in which the positioning holes 114 pass through the seat 11 as an example for illustration, but is not limited thereto.

There are two bumps 115, two guide members 116, and an accommodation recess 117 disposed at the other surface of the seat 11 opposite to the groove 113. The two bumps 115 and the two guide members 116 are located in the accommodation recess 117. The two bumps 115 are respectively disposed at the seat 11 adjacent to the locking hole 111 and located between the two slots 112. The bumps 115 and the slots 112 are disposed around the locking hole 111 in an alternate manner on the seat 11. The two guide members 116 are disposed between the bumps 115 and the slots 112 in an equal-spaced manner on the seat 11, and respectively have an inclined surface 1161. The inclined surface 1161 is obliquely disposed on the guide member 116 and is obliquely disposed from one side of the seat 11 adjacent to the slot 112 towards one side of the seat 11 adjacent to the bump 117, so that the height of the guide member 116 increases from one side adjacent to the slot 112 to one side adjacent to the bump 117.

As shown in FIGS. 2 and 3, the support 12 has a buckling member 13 and has a bearing portion 121 and a joining portion 122 at two ends respectively. The bearing portion 121 has a plurality of connecting holes 1211 for screws or other locking members (not shown) to pass through and be locked on the display 2, so that the bearing portion 121 is connected to the display 2 is shown in FIG. 1. The joining portion 122 has a pivotal pillar 123, two fixing pillars 124, a rib 125, a stopper portion 126, and a side wall 127. The pivotal pillar 123 and the fixing pillars 124 are disposed at the other end of the joining portion 122 opposite to the bearing portion 121, and are respectively corresponding to the locking hole 111 and the positioning holes 114 of the seat 11. Moreover, a diameter of the pivotal pillar 123 is smaller than an aperture of the locking hole 111, and a diameter of the fixing pillars 124 matches with an aperture of the positioning holes 114. The rib 125 and the stopper portion 126 are located at positions on the joining portion 122 adjacent to the pivotal pillar 123, and the rib 125 is connected to the pivotal pillar 123. The side wall 127 is annularly disposed at one end of the joining portion 122 opposite to the bearing portion 121 and is corresponding to the groove 113 on the seat 11. Moreover, a width and a height of the side wall 127 match with a width and a depth of the groove 113, so that the side wall 127 can be embedded in the groove 113.

Figure 4:
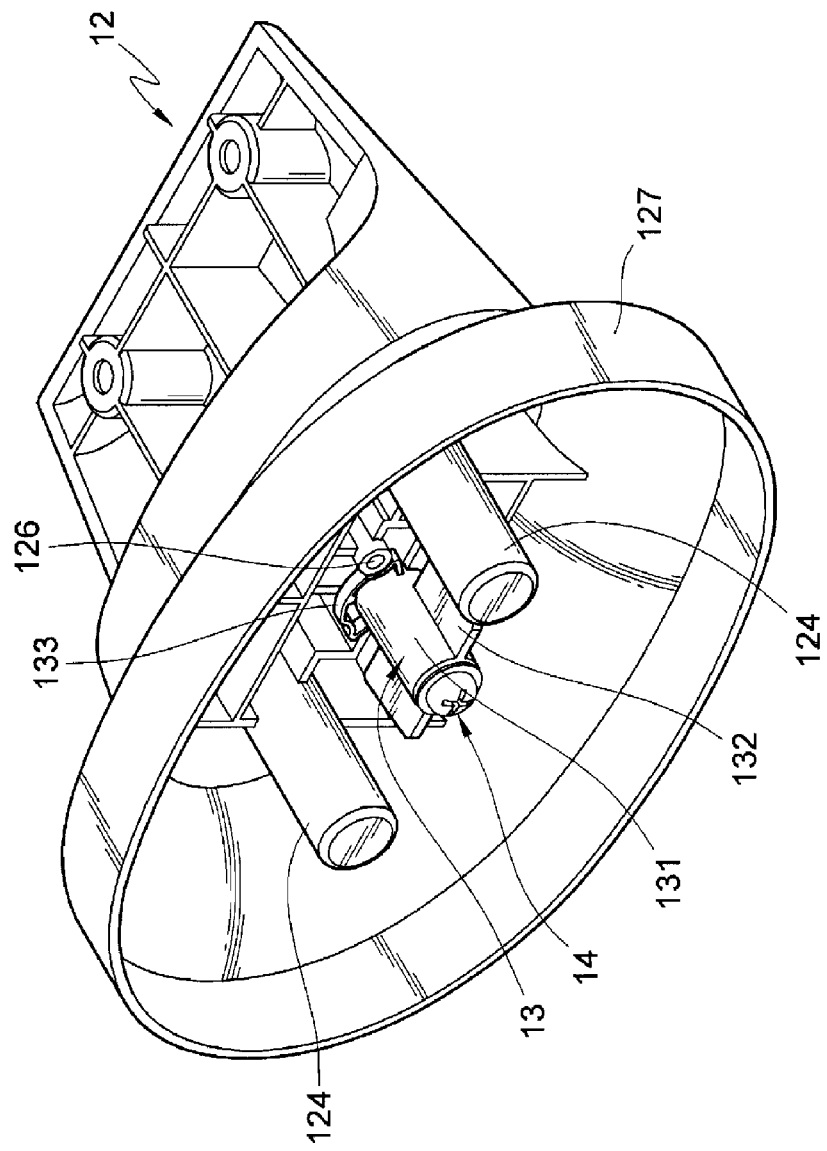
FIG. 4 is a schematic structural view of a buckling member at a release position in an embodiment of the present invention.

The buckling member 13 and the limiting member 14 are normally disposed on the pivotal pillar 123 of the support 12 (as shown in FIG. 4). The buckling member 13 has a main body 131 and two baffles 132. The two baffles 132 are symmetrically disposed on an external surface at two sides of the main body 131 and respectively corresponding to the two slots 112 of the seat 11. Meanwhile, a thickness of the baffles 132 matches with a width of the slots 112, and the baffles 132 are enabled to remove from the seat 11 through the slots 112.

The main body 131 of the buckling member 13 is in the form of a hollow sleeve. An inner diameter of the main body 131 matches with the diameter of the pivotal pillar 123 of the support 12, and an outer diameter of the main body 131 matches with the aperture of the locking hole 111 of the seat 11. The limiting member 14 is used to maintain the buckling member 13 on the pivotal pillar 123 and avoid detachment of the buckling member 13 from the pivotal pillar 123. When the limiting member 14 is a screw, the pivotal pillar 123 has a screw hole 1231 thereon, and a diameter at one end of the limiting member 14 matches with an aperture of the screw hole 1231 and a diameter at the other end of the limiting member 14 matches with the outer diameter of the main body 131 of the buckling member 13. As a result, when the buckling member 13 is fitted on the pivotal pillar 123 by the main body 131, one end of the limiting member 14 is screwed in the screw hole 1231 and the other end of the limiting member 14 is pressed against the pivotal pillar 123 and the main body 131, so that the buckling member 13 is stopped by the limiting member 14 and maintained on the support 12.

Figure 5:
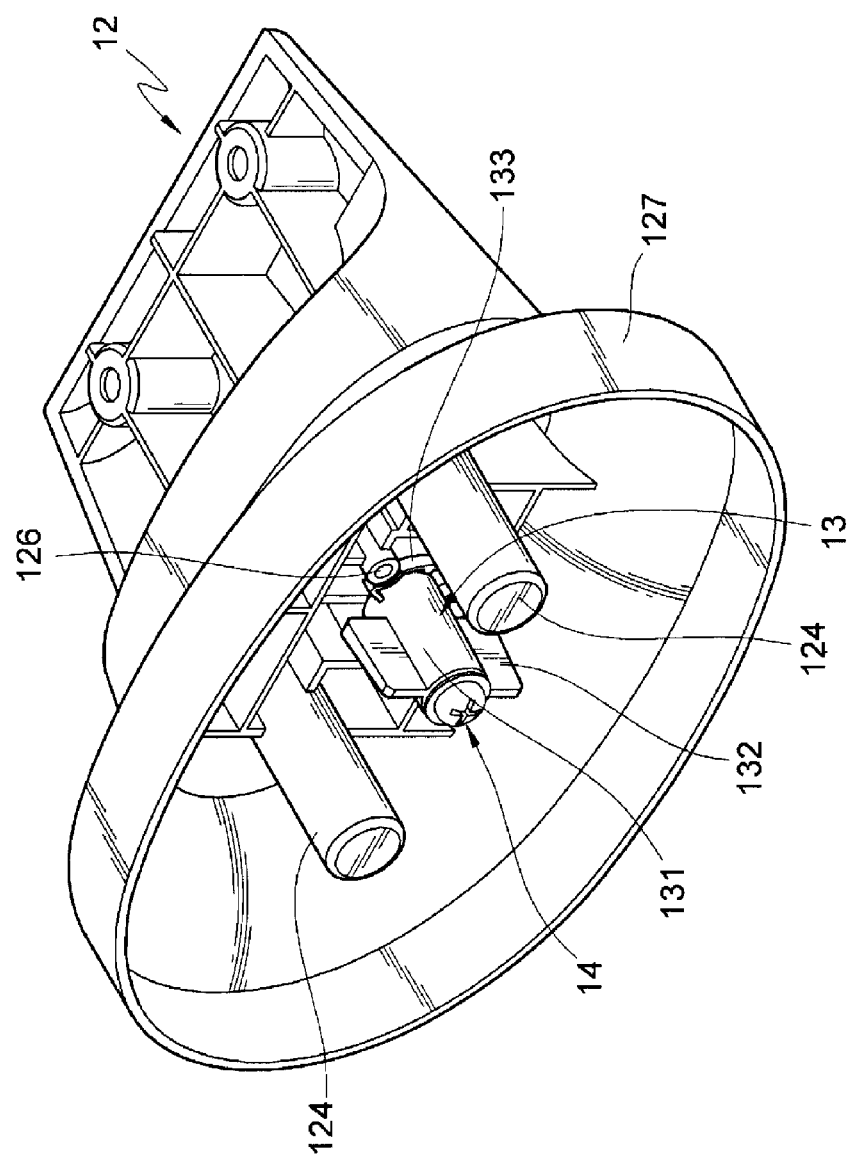
FIG. 5 is a schematic structural view of the buckling member at a clamping position in an embodiment of the present invention.
Figure 6B:
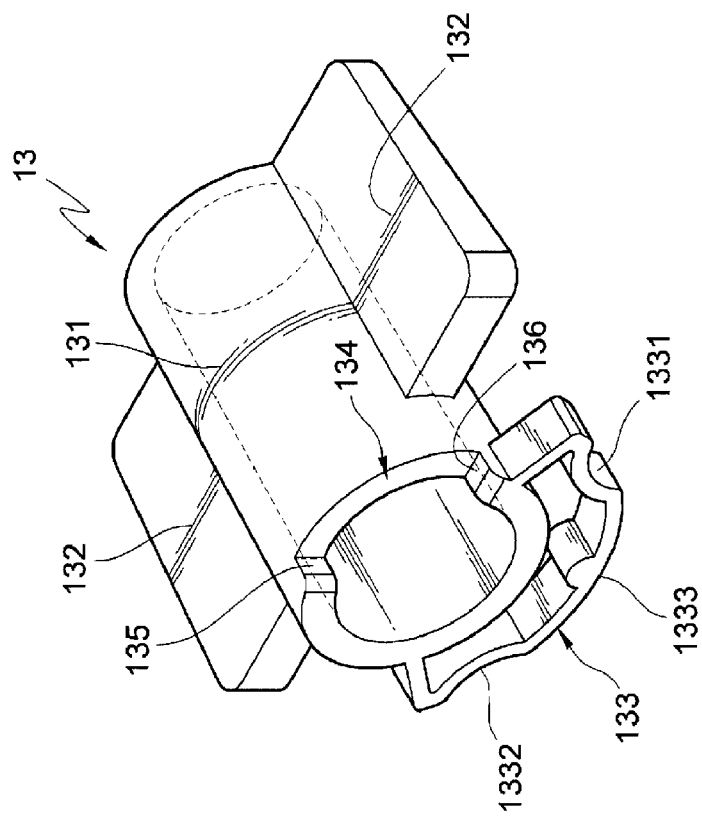
FIGS. 6A and 6B are schematic structural views of the buckling member in an embodiment of the present invention.
Figure 6A:
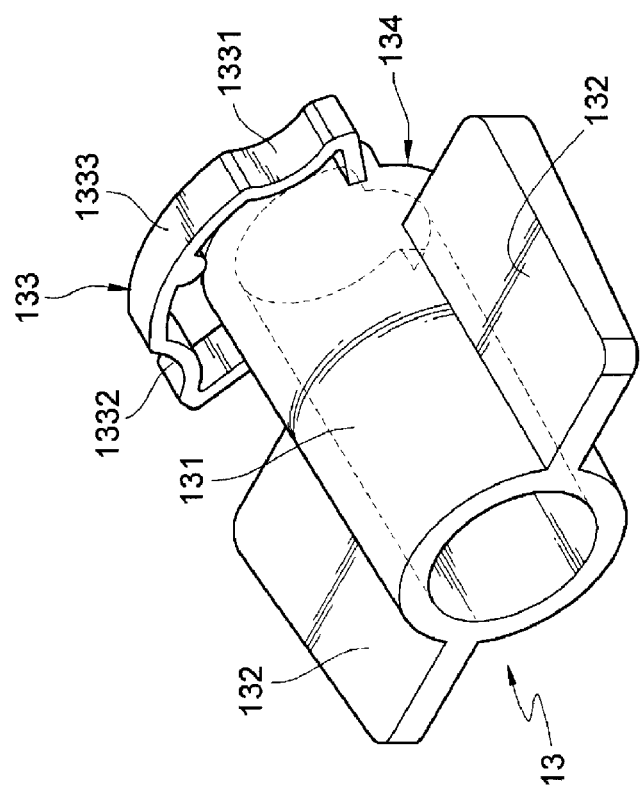
Figure 7:
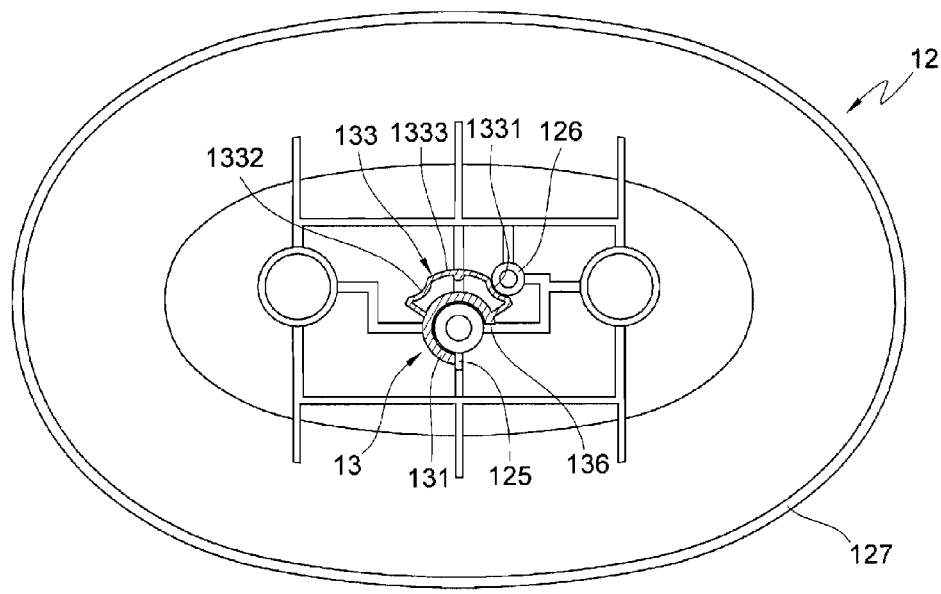
FIG. 7 is a schematic cross-sectional view of the buckling member at the release position in an embodiment of the present invention.
Figure 8:
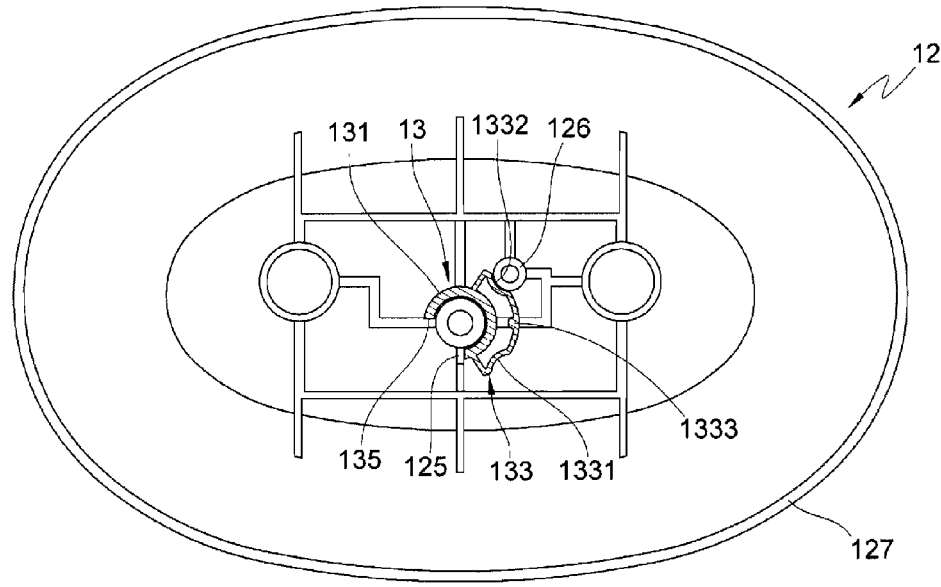
FIG. 8 is a schematic cross-sectional view of the buckling member at the clamping position in an embodiment of the present invention.
Figure 9:
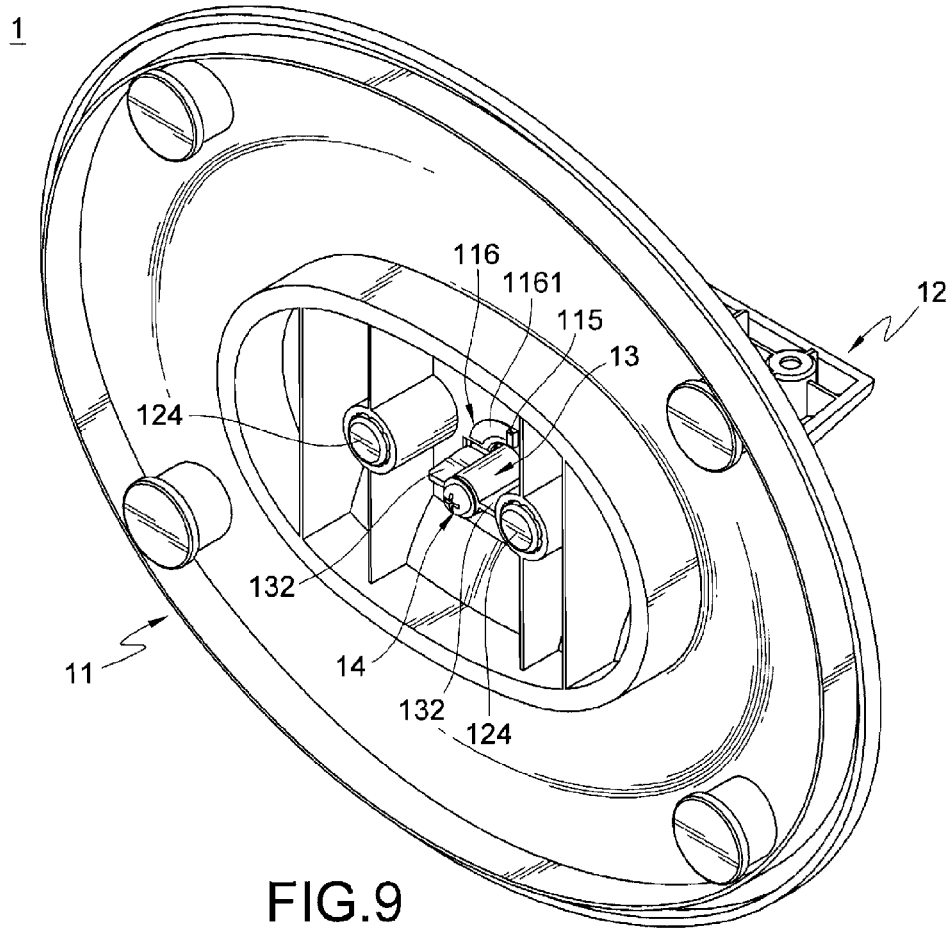
FIG. 9 is a schematic assembly view of a support joined to a seat in an embodiment of the present invention.
Figure 10:
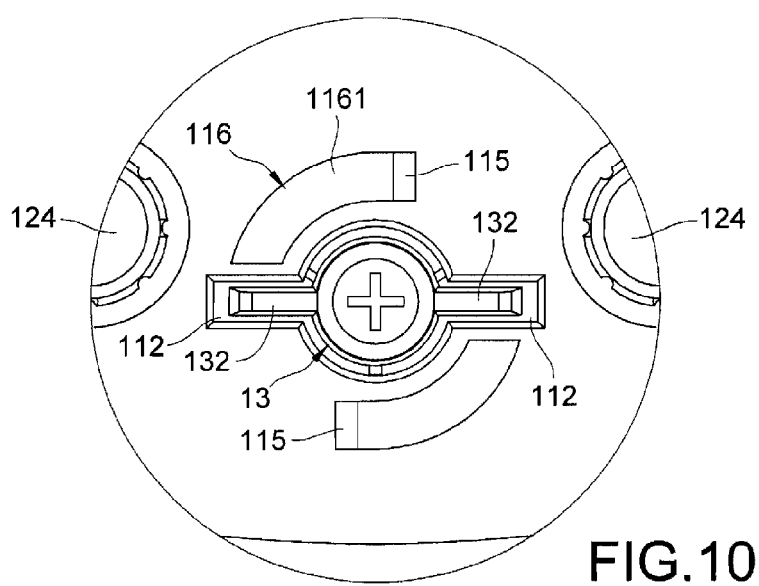
FIG. 10 is a schematic partial enlarged view of the support joined to the seat in an embodiment of the present invention.
Figure 11:
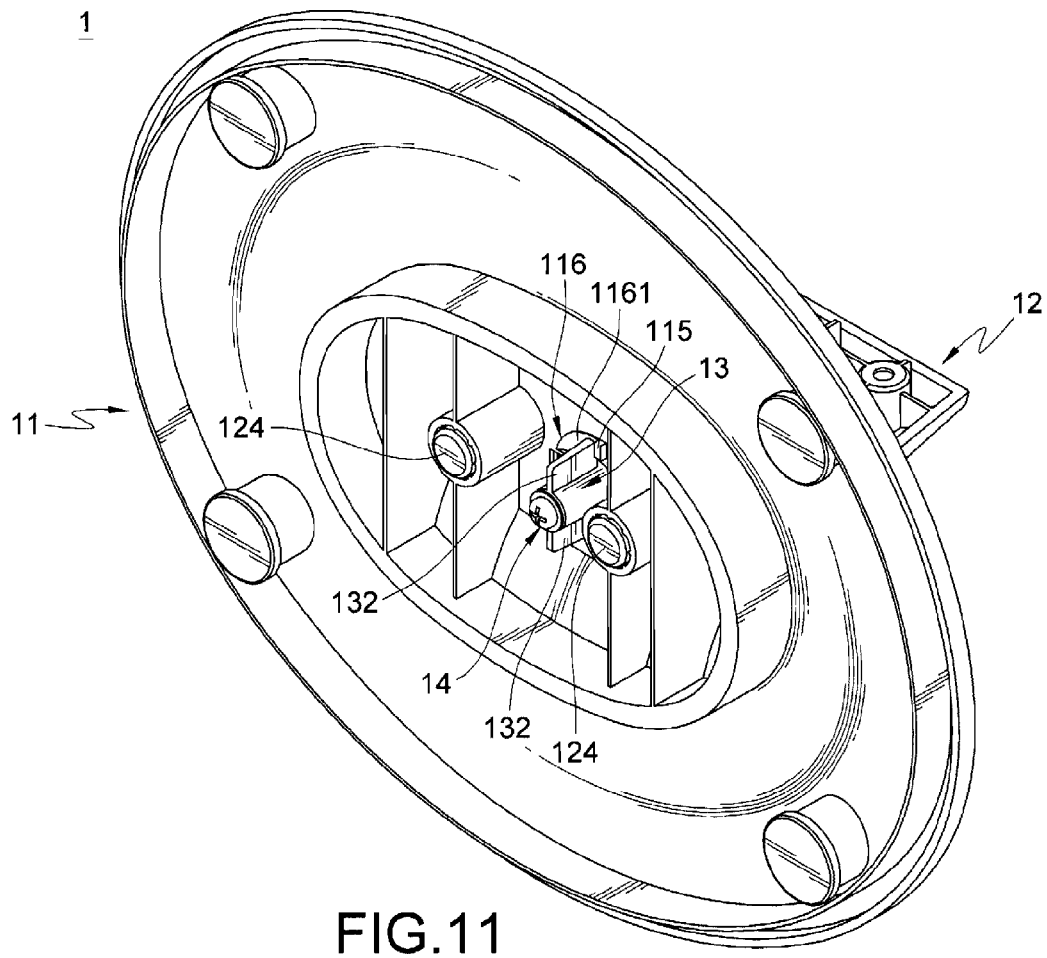
FIG. 11 is a schematic assembly view of the support locked on the seat in an embodiment of the present invention.
Figure 12:
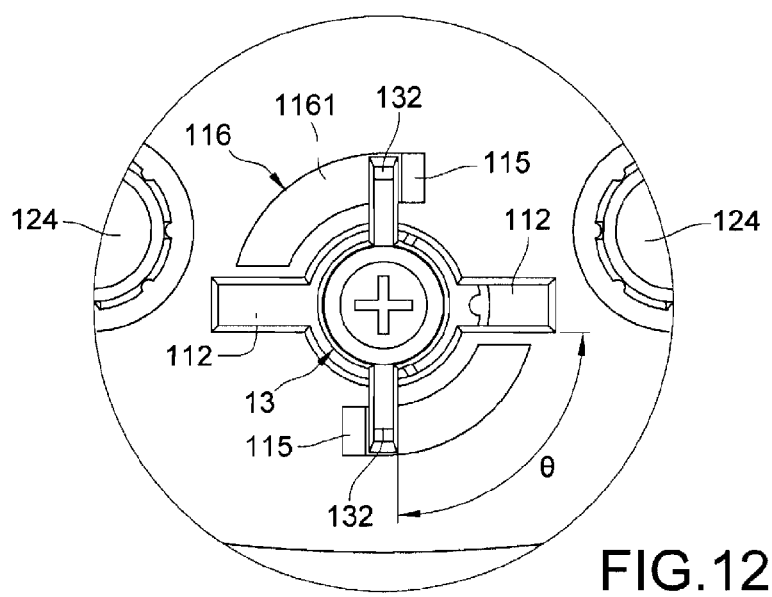
FIG. 12 is a schematic partial enlarged view of the support locked on the seat in an embodiment of the present invention.

Referring to FIGS. 4 to 8, the main body 131 of the buckling member 13 has an urging portion 133 and a notch 134 that are disposed at one end of the main body 131 opposite to the support 12. Moreover, the main body 131 has a first sidewall 135 and a second sidewall 136 opposite to each other at positions adjacent to the notch 134. When the buckling member 13 is fitted on the pivotal pillar 123 of the support 12 by the main body 131, the rib 125 connected to the pivotal pillar 123 is located in the notch 134. Moreover, when the buckling member 13 rotates about the pivotal pillar 123, as the first sidewall 135 and the second sidewall 136 of the main body 131 are stopped by the rib 125, the buckling member 13 is limited to be rotatable between a release position and a clamping position. When the buckling member 13 is at the release position, the buckling member 13 is pressed against the rib 125 by the first sidewall 135 of the main body 131 (as shown in FIGS. 4 and 7). When the buckling member is at the clamping position, the buckling member 13 is pressed against the rib by the second sidewall 135 of the main body 131 (as shown in FIGS. 5 and 8).

In addition, the disposition manner in which the notch 134 of the main body 131 matches with the rib 125 of the support 12 not only limits the rotation of the buckling member 13 between the release position and the clamping position, but also serves as a fool-proof mechanism between the buckling member 13 and the pivotal pillar 123. In the operation of fitting the buckling member 13 on the pivotal pillar 123, the buckling member 13 is pushed by the rib 125 and partially exposed out of one end of the pivotal pillar 123 provided with the screw hole 1231 when the rib 125 is not accommodated in the notch 134. In this manner, the production and assembly personnel may find the problem and adjust an assembly direction of the buckling member 13 in real time, thereby improving the assembly efficiency and yield in semi-finished products of the base structure.

Still referring to FIGS. 4 to 8, both ends of the urging portion 133 are respectively connected to the external surface of the main body 131, so that the rest of the urging portion 133 normally has a space from the main body 131. The urging portion 133 has a first fastening groove 1331 and a second fastening groove 1332 symmetrically disposed thereon and an elastic segment 1333 disposed between the first fastening groove 1331 and the second fastening groove 1332. The spacing between the urging portion 133 and the main body 131 provides the elastic segment 1333 with an elastic deformation force that draws the elastic segment 1333 close to or separates the elastic segment 1333 from the main body 131. Moreover, a distance between the elastic segment 1333 and the main body 131 is larger than a distance between the first fastening groove 1331 and the main body 131 as well as a distance between the second fastening groove 1332 and the main body 131. The distance between the first fastening groove 1331 and the main body 131 and the distance between the second fastening groove 1332 and the main body 131 respectively match with a distance between the stopper portion 126 and the pivotal pillar 123 of the support 12.

Therefore, when the buckling member 13 is fitted on the pivotal pillar 123, the elastic segment 1333 of the urging portion 133 is stopped by the stopper portion 126 and then limits the capability of the buckling member 13 of free rotation on the pivotal pillar 123. Meanwhile, the first fastening groove 1331 or the second fastening groove 1332 of the urging portion 133 is located between the pivotal pillar 123 and the stopper portion 126 and fastened to the stopper portion 126.

Based on the above, when the buckling member 13 is at the release position (as shown in FIGS. 4 and 7), the first fastening groove 1331 of the urging portion 133 is located between the pivotal pillar 123 and the stopper portion 126 of the support 12 and fastened to the stopper portion 126. At this time, as the first sidewall 135 of the main body 131 and the elastic segment 1333 of the urging portion 133 are respectively stopped by the rib 125 and the stopper portion 126 of the support 12 to limit the capability of the buckling member 13 of free rotation on the pivotal pillar 123, the stopper portion 126 is prevented from detaching from the first fastening groove 1331 and the buckling member 13 is temporarily limited at the release position.

On the contrary, an external force is applied to rotate the buckling member 13, so as to enable the second sidewall 136 of the main body 131 to move towards the rib 125 of the support 12. At this time, the stopper portion 126 is detached from the first fastening groove 1331 and pressed against the elastic segment 1333 to elastically deform the elastic segment 1333. When the second sidewall 136 is pressed against the rib 125 with the rotation of the buckling member 13, the second fastening groove 1332 of the urging portion 133 is located between the pivotal pillar 123 and the stopper portion 126 of the support 12 and accordingly fastened to the stopper portion 126, so that the buckling member 13 is located at the clamping position (as shown in FIGS. 5 and 8). At this time, since the second sidewall 136 of the main body 131 and the elastic segment 1333 of the urging portion 133 are respectively stopped by the rib 125 and the stopper portion 126 of the support 12 to limit the capability of the buckling member 13 of free rotation on the pivotal pillar 123, the buckling member 13 is temporarily limited at the clamping position.

Referring to FIGS. 2, 3, 4, 9, and 10 at the same time, as the buckling member 13 and the limiting member 14 have been pre-mounted on the support 12, the base structure 1 is assembled as follows. First, the buckling member 13 is rotated to the release position. Then, the support 12 is moved to be above the seat 11, the side wall 127 and the fixing pillars 124 of the support 12 are respectively aligned with the groove 113 and the positioning holes 114 of the seat 11, and the main body 131 and the baffles 132 of the buckling member 13 are respectively located right above the locking hole 111 and the slots 112 of the seat 11. Afterwards, the side wall 127 of the support 12 is embedded in the groove 113 of the seat 11 with the fixing pillars 124 of the support 12 and the main body 132 and the baffles 132 of the buckling member 13 respectively passing through the positioning holes 114, the locking hole 111, and the slots 112, so as to join the joining portion 122 of the support 12 to the seat 11.

Referring to FIGS. 2, 3, 11, and 12 at the same time, after the support 12 is joined to the seat 11, an external force is applied to rotate the buckling member 13. When the buckling member 13 rotates to the clamping position, the baffles 132 are displaced from the slots 112 to the surface of the seat 11 with the rotation of the buckling member 13 and form an angle θ with the slots 112 of the seat 11, thereby having a retaining relationship with the seat 11, so that the baffles 132 are stopped by the seat 11 and unable to be removed from the seat 11. In this process, the baffles 132 are guided by the inclined surfaces 1161 of the guide members 116 to gradually urge the seat 11 and be pressed against the bumps 115. Therefore, the baffles 132 are closely attached to the seat 11 and the support 12 is locked on the seat 11.

On the contrary, when the buckling member 13 is rotated again from the clamping position to the release position, the angle formed between the baffles 132 and the slots 112 disappears, and the retaining relationship between the baffles 132 and the seat 11 is removed, so that the support 12 can be detached from the seat 11 by respectively passing the main body 131 and the baffles 132 of the buckling member 13 through the locking hole 111 and the slots 112 of the seat 11. Therefore, in the disassembly and assembly process of the seat structure 1, the disassembly and assembly can be carried out smoothly by merely rotating the buckling member 13 without using other tools, which not only simplifies the disassembly/assembly of the seat structure 1 but also greatly improves the assembly efficiency of the seat structure 1. Meanwhile, since the buckling member 13 is normally disposed on the support 12, the drop or loss of the buckling member 13 in the disassembly and assembly process of the seat structure may be effectively avoided.

Figure 13:
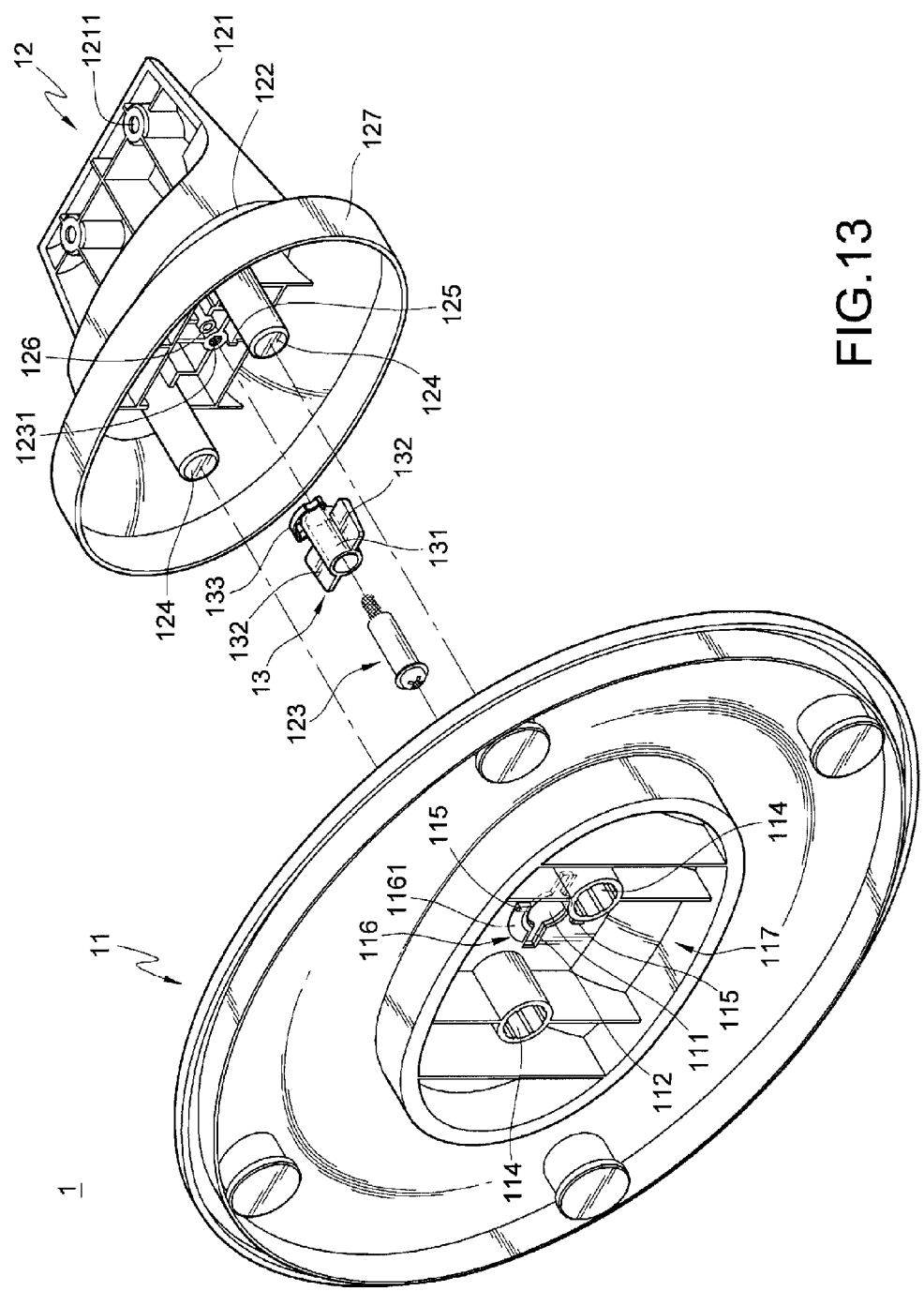
FIG. 13 is a schematic exploded view of a base structure in another embodiment of the present invention.

Additionally, in other embodiments of the present invention, the numbers, positions, and structural forms of the slots, positioning holes, bumps, and guide members on the seat, the numbers, positions, and structural forms of the fixing pillars, rib, and stopper portion on the support, and the numbers, positions, and structural forms of the baffles, urging portion, and notch of the buckling member can all be appropriately configured depending on the requirement of the joining between the support and the seat, and are not limited to those described in the above embodiment. For example, only a single slot is disposed on the seat, only a single baffle is disposed on the buckling member, and the like. Alternatively, as shown in FIG. 13, in another embodiment, the pivotal pillar 123 is set to be a screw-like structure and the screw hole 1231 is disposed on the support 12, so that the pivotal pillar 123 is locked in the screw hole 1231 and meanwhile the buckling member 13 is limited on the support 12.

What is claimed is:

1. A base structure, for bearing a display, comprising:
    a seat, including a locking hole and at least one slot extends from a periphery of the locking hole; and
    a support, including a bearing portion, a joining portion, and a buckling member, wherein the bearing portion is connected to the display, the joining portion has a pivotal pillar that passes through the locking hole, the buckling member has a main body and at least one baffle, the baffle is disposed on a surface of the main body, and the main body is fitted on the pivotal pillar and is rotatable about the pivotal pillar between a clamping position and a release position,
    wherein when the buckling member is at the release position, the support is detached from the seat by respectively passing the main body and the baffle through the locking hole and the slot; and when the buckling member is at the clamping position, the baffle and the slot form an angle, so as to lock the support on the seat.

2. The base structure according to claim 1, wherein the seat further has a groove and a side wall, and the side wall is embedded in the groove.

3. The base structure according to claim 1, wherein the seat further has at least one positioning hole beside the locking hole, the support further has at least one fixing pillar, and the fixing pillar is inserted in the positioning hole.

4. The base structure according to claim 1, further having a limiting member disposed on the pivotal pillar of the support to limit detachment of the buckling member from the pivotal pillar.

5. The base structure according to claim 4, wherein the limiting member is a screw, the pivotal pillar has a screw hole, one end of the limiting member is locked in the screw hole, and the other end of the limiting member is pressed against the pivotal pillar and the buckling member.

6. The base structure according to claim 1, wherein the joining portion of the support further has a rib, the buckling member has a notch, the rib is located in the notch, and when the buckling member rotates relative to the pivotal pillar, two opposite sidewall surfaces of the buckling member adjacent to the notch are respectively pressed against the rib to limit the buckling member to rotate between the clamping position and the release position.

7. The base structure according to claim 1, wherein the joining portion of the support further has a stopper portion, the buckling member further has an urging portion, and the buckling member is temporarily fixed at the clamping position or the release position by pressing the urging portion against the stopper portion.

8. The base structure according to claim 7, wherein the urging portion has a first fastening portion and a second fastening portion, when the buckling member is at the clamping position, the first fastening portion is fastened to the stopper portion, and when the buckling member is at the release position, the second fastening portion is fastened to the stopper portion.

9. The base structure according to claim 1, further having at least one bump adjacent to the locking hole, and when the buckling member is at the clamping position, the baffle is pressed against the bump.

10. The base structure according to claim 9, further having a guide member disposed between the slot and the bump.

11. The base structure according to claim 10, wherein the guide member has an inclined surface obliquely disposed on the guide member from the slot towards the bump.

12. The base structure according to claim 1, wherein the seat further has an accommodation recess, and the buckling member is accommodated in the accommodation recess.

13. A liquid crystal display (LCD), comprising:
    a display;
    a seat, under the display, the seat including a locking hole and at least one slot extends from a periphery of the locking hole; and
    a support, including a bearing portion, a joining portion, and a buckling member, wherein the bearing portion is connected to the display, the joining portion has a pivotal pillar that passes through the locking hole, the buckling member has a main body and at least one baffle, the baffle is disposed on a surface of the main body, and the main body is fitted on the pivotal pillar and is rotatable about the pivotal pillar between a clamping position and a release position,
    wherein when the buckling member is at the release position, the support with the display is detached from the seat by respectively passing the main body and the baffle through the locking hole and the slot; and when the buckling member is at the clamping position, the baffle and the slot form an angle, so as to lock the support with the display on the seat.

14. The LCD according to claim 13, wherein the seat further has a groove and a side wall, and the side wall is embedded in the groove.

15. The LCD according to claim 13, wherein the seat further has at least one positioning hole beside the locking hole, the support further has at least one fixing pillar, and the fixing pillar is inserted in the positioning hole.

16. The LCD according to claim 13, further having a limiting member disposed on the pivotal pillar of the support to limit detachment of the buckling member from the pivotal pillar.

17. The LCD according to claim 16, wherein the limiting member is a screw, the pivotal pillar has a screw hole, one end of the limiting member is locked in the screw hole, and the other end of the limiting member is pressed against the pivotal pillar and the buckling member.

18. The LCD according to claim 13, wherein the joining portion of the support further has a rib, the buckling member has a notch, the rib is located in the notch, and when the buckling member rotates relative to the pivotal pillar, two opposite sidewall surfaces of the buckling member adjacent to the notch are respectively pressed against the rib to limit the buckling member to rotate between the clamping position and the release position.

19. The LCD according to claim 13, wherein the joining portion of the support further has a stopper portion, the buckling member further has an urging portion, and the buckling member is temporarily fixed at the clamping position or the release position by pressing the urging portion against the stopper portion.

20. The LCD according to claim 19, wherein the urging portion has a first fastening portion and a second fastening portion, when the buckling member is at the clamping position, the first fastening portion is fastened to the stopper portion, and when the buckling member is at the release position, the second fastening portion is fastened to the stopper portion.

21. The LCD according to claim 13, further having at least one bump adjacent to the locking hole, and when the buckling member is at the clamping position, the baffle is pressed against the bump.

22. The LCD according to claim 21, further having a guide member disposed between the slot and the bump.

23. The LCD according to claim 22, wherein the guide member has an inclined surface obliquely disposed on the guide member from the slot towards the bump.

24. The LCD according to claim 13, wherein the seat further has an accommodation recess, and the buckling member is accommodated in the accommodation recess.

* * * * *